United States Patent [19]
McGurk et al.

[11] 3,914,172
[45] Oct. 21, 1975

[54] PULP STOCK PRESSURE SCREEN

[75] Inventors: Stanley E. McGurk, Westmount; Wavell Frederick Cowan, Montreal West, both of Canada

[73] Assignee: Highratio Screens Ltd., Montreal, Canada

[22] Filed: Aug. 23, 1973

[21] Appl. No.: 390,794

[30] Foreign Application Priority Data
Aug. 31, 1972 United Kingdom............... 40338/72

[52] U.S. Cl. ............... 209/273; 209/380; 209/306; 210/236
[51] Int. Cl.² .......................................... B07B 1/04
[58] Field of Search .......... 209/270, 273, 305, 306, 209/380; 210/236, 537, 300, 303, 304

[56] References Cited
UNITED STATES PATENTS

| | | | |
|---|---|---|---|
| 1,037,597 | 9/1912 | Coppage............................ | 209/270 |
| 1,722,874 | 7/1929 | Wells................................. | 209/273 |
| 2,122,075 | 6/1938 | Thorold............................. | 209/270 X |
| 2,936,075 | 5/1960 | Davis................................. | 210/236 |
| 3,081,873 | 3/1963 | Cowan............................... | 209/273 |
| 3,243,041 | 3/1966 | Cowan............................... | 209/273 |
| 3,245,535 | 4/1966 | Cowan............................... | 209/273 X |
| 3,508,651 | 4/1970 | Nooper.............................. | 209/273 X |
| 3,633,743 | 1/1972 | Gooding............................ | 209/270 X |
| 3,849,302 | 11/1974 | Seifeit................................ | 209/273 |

FOREIGN PATENTS OR APPLICATIONS
1,061,559   11/1953   France................................. 210/236

*Primary Examiner*—Robert Halper
*Attorney, Agent, or Firm*—Robert E. Mitchell; Alan Swabey

[57] ABSTRACT

There is described a pulp screen having an elongated cylindrical housing with an inlet end and a discharge end, a concentric hollow impeller shaft within the housing, a concentric cylindrical screen about the shaft and spaced from the housing walls to provide an accepted stock discharge space; there are radially extending impeller vanes on the shaft for imparting cylindrical force to the pulp stock, and circumferentially extending plates are provided between the vanes near the discharge end flaring outwardly downstream of the shaft to reduce the effective space between the impeller and the inner surface of the screen thereby increasing the velocity of the stock passing in the zone near the discharge zone. There is a first discharge for the high density tailings and a second adjacent discharge for the lesser density tailings which can be recirculated.

7 Claims, 5 Drawing Figures

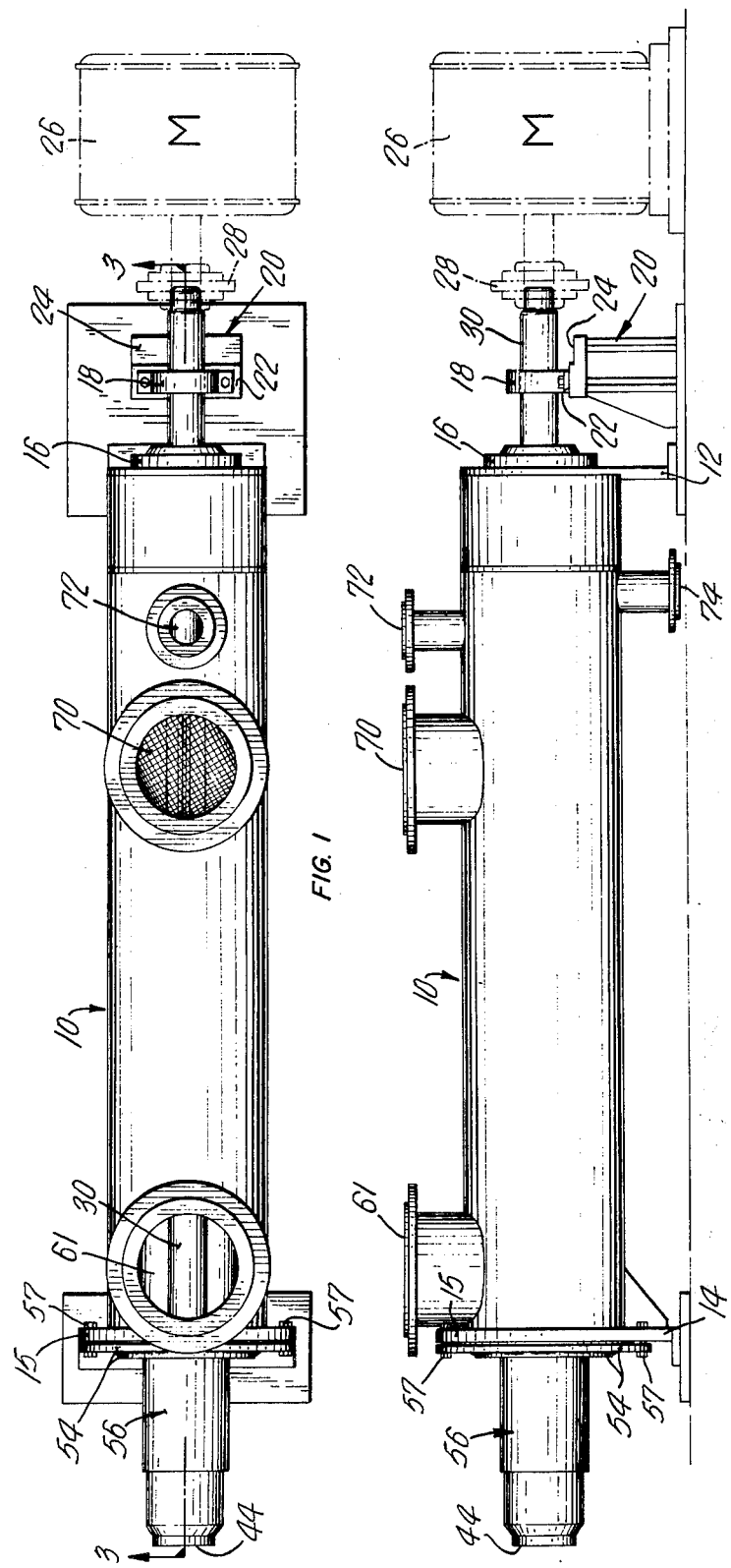

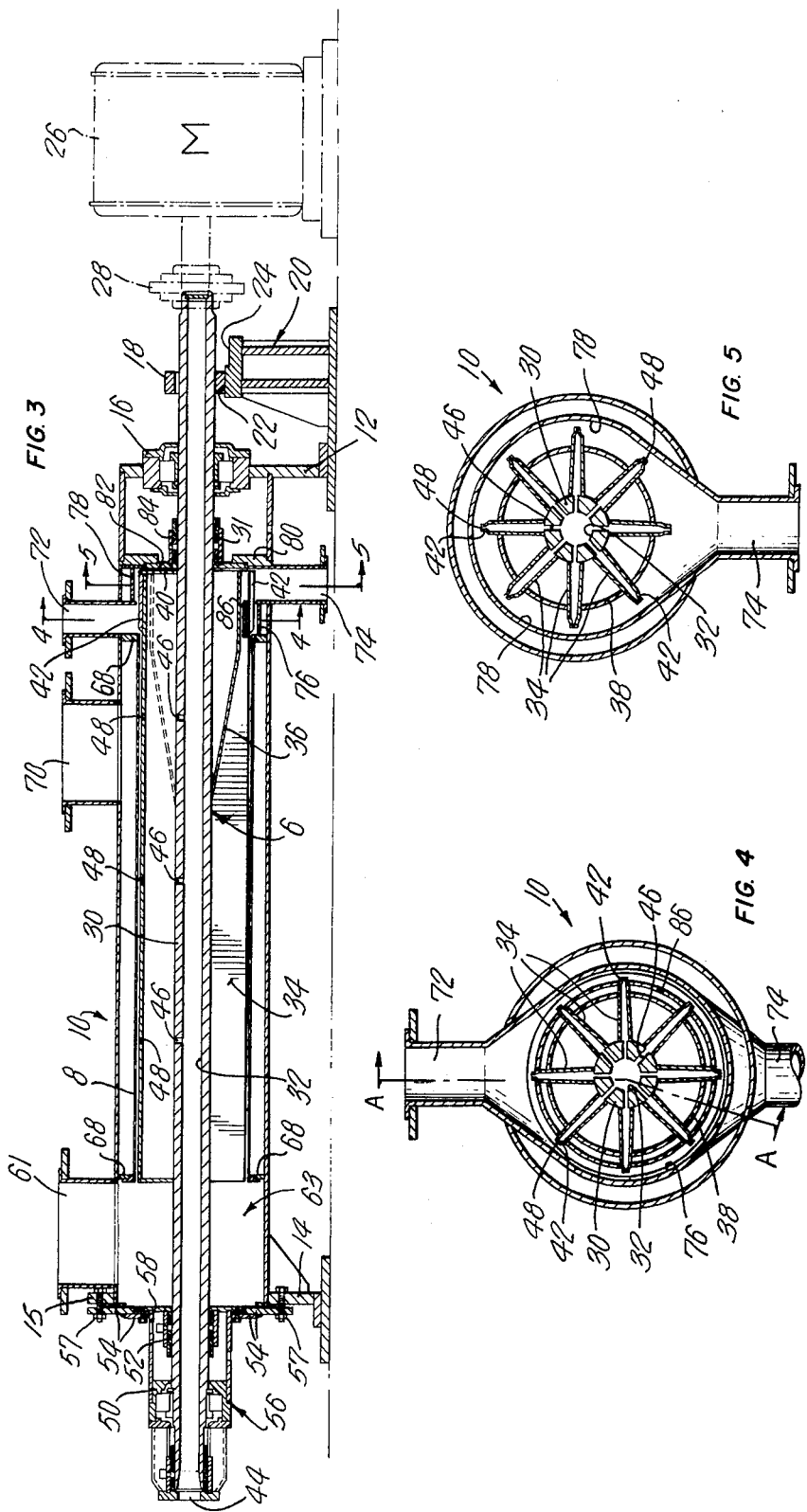

PULP STOCK PRESSURE SCREEN

BACKGROUND OF INVENTION

1. Field of Invention

The present invention relates to the refining of pulp stock by removing the larger pulp particles from a water flow and more particularly to screening apparatus for such separation.

2. DESCRIPTION OF PRIOR ART

Early commercial screening of pulp was conducted by means of the so-called flat screen. This consisted of nothing more than an array of flat screen plates containing small slits through which acceptable pulp only could flow. An air pulsation apparatus established beneath these plates assisted to keep the slits from plugging.

These screens have been largely superseded by the so-called gravity or open-to-atmosphere centrifugal screens. These screens consist of a multi-vaned rotor which directs flow of stock outward to a retaining cylindrical, perforated screen plate. Accepted stock flows through the screen plate and discharge at atmospheric pressure, thus establishing the terminology, open-to-atmosphere, which is applied to this screen.

The perforations defined in the screen plate for this type of screen are larger than those used for the flat screens. Screening efficiency in gravity screens is achieved by virtue of the existance in the gravity screen of a high-consistency zone of pulp fibres and shives immediately adjacent to the screen plate. Movement of pulp in this zone from the feed end to the discharge end of the screen plate is due to the pressure differential between the feed and discharge end of the screen plate. Centrifugal forces caused by the rotating vanes cause stock to flow out to the screen plate.

Although the interior of the screen is completely filled with stock at the feed end, flow through the screen plate reduces the amount of stock inside the screen so that at the discharge end only a relatively small volume of stock remains. This stock is mostly a thin layer of rejected stock held against the screen plate by centrifugal force. The pressure between the feed and discharge end referred to above is the difference in gravity head of the stock between the feed end where the screen is full and the thin layer of stock at the discharge end of the screen plate. Since gravity screens require large screen areas, and since the centrifugal forces are proportional to the diameter of the screen, all gravity screens employ a relatively large diameter screen basket with a relatively low length to diameter ratio, in the neighbourhood of 1:1.

Recent development in pulp screening have been designed to "pressurize" the screen in order to obtain the advantage of a pump through operation and to minimize the air entrainment which in gravity screening can produce foaming and other problems associated with the presence of air in the pulp stock.

It is the high consistency zone of pulp against the screen plate which in essence functions as the mechanism for screening, and not necessarily the size of the holes as in the flat screens, in the pressurized screen as the gravity screen. On the other hand, the higher pressure level in the screen induces a higher flow rate and hence a pressure drop across the screen plate which means a greater tendency to cause plugging. Centrifugal and gravitational forces which provide for adequate axial movements of stock in the screening zone of a gravity screen become inadequate once the screen is pressurized. This accounts for the fact that the simple pressurization of a conventionally designed gravity screen will not function efficiently. Plugging of the screen plate will rapidly occur in almost every situation.

Existing successful pressure screens function by confining the stock in the screen to an annular space close to the screen plate, commonly achieved by building the rotor as a drum. The stock flow in the annular volume must have a velocity sufficient to cause movement of the pulp in the screening zone towards the discharge end of the screen. Such screens result in a high reject rate in order to maintain this movement and avoid screen plugging. In fact, unless the reject rate is increased in proportion to the increased production rate, a build-up of the screening zone, causing an increased flow of slivers into the accepted stock and reducing the quality of the accepted stock.

SUMMARY OF INVENTION

It is an aim of the present invention to provide a pulp screening apparatus having the increased production capacity of the above described pressure screens, but operating at substantially lower reject rates without an increase in tendency towards plugging, and at the same time permitting an increase in performance and efficiency of the screen.

A construction in accordance with the present invention includes an elongated enclosed housing, a rotatable shaft extending axially of the housing and coextensive therewith, impeller vanes extending radially from the shaft and fixed thereto, a perforated screen plate of circular cross section mounted concentrically of the shaft, the screen being of such dimensions that there is a space between the screen and the wall of the housing; the radius of the screen being slightly larger than the radius of the impeller vanes on the shaft so that there is provided a kinetic shearing zone between the edge of the vanes and the inner surface of the perforated screen. An inlet is provided in the area of one end of the closed housing for passing water and stock therethrough, a first discharge communicating with the space defined between the housing and the screen, and at least one tailings discharge communicating within the area of the other end of the housing but communicating with the inner space defined by the screen plate, the diameter of the screen plate in the discharge area being such that the cross-sectional area of the space between the impeller and the screen plate is at a functional minimum and the screen is proportionally longer so that the area of the screen plate remains constant for a predetermined screen requirement.

Immediately adjacent the end of the screen there could be provided a first discharge means through which the layer of stock immediately adjacent to the screen plate, containing the highest density of rejected stock, is passed. An annular splitting ring is mounted on the rotor in the area of the first discharge means to separate the less dense rejected stock from the first discharge means. A second discharge means adjacent to the first discharge means for discharging the less dense rejected stock and passing to recirculation means could also be provided.

The housing and screen may be so constructed as to permit easy replacement of the screen whereby a cantilever arrangement of the shaft can be provided at one end thereof allowing easy removal of the housing wall at the other end thereof for removal of the screen.

By restricting the stock flow to a relatively narrow annulus adjacent to the screen plate at the discharge end, the velocity derived from the pumping energy is maintained or increased. This velocity sweeps along the pulp in the high consistency screening zone and prevents the screen plate from plugging. The splitting of the denser rejected stock in the high consistency screening zone from the less dense rejected stock allows a combined discharge from the rejects end of the screen sufficiently large to keep the sliver density in this flow down to a level consistent with a lower flow of slivers into the accepted stock. The recirculated stock is sufficiently close in sliver density to the feed stock of the screen that its recirculation to the feed causes no disturbance in operation.

To reduce the quantity of acceptable pulp which passes through the first tailing or reject discharge in order to prevent plugging, the reject end of the annulus is made as narrow as possible. That is, it is made only large enough to ensure that the slivers, etc., contained in the reject flow will not plug up the annular exit. It follows that the reject discharge area will then be directly related to diameter, and that for a given axial flow velocity, the reject rate will be proportional to diameter.

This particular fact has not been recognized in the prior art; and as a result all pressure screens have followed the pattern established, that is, a length to diameter ratio of around 1:1. Thus, a practice, which is essential to the effective operation of the open-to-atmosphere screen is detrimental to the efficient operation of the pressurized screen.

One feature of the new apparatus is that the length to diameter ratio is as large as mechanically feasible; that is, the diameter is as small as mechanically feasible. The screen thus allows increased axial stock flow velocities to be attained at reduced reject rate, thus increasing the production capacity that can be sustained without plugging the screen. Also, the increased length of screen provides increased contact time for stock against the screen and in this way contributes to increased production capacity. The net result is that the new screen has greatly increased capacity at a reduced percentage rate of rejects, yielding a substantially more efficient screening operation.

BRIEF DESCRIPTION OF THE DRAWINGS

Having thus described the nature of the invention, it shall be described in more detail with particular reference to the accompanying drawings, in which:

FIG. 1 is a top plan view of the apparatus in accordance with the invention;

FIG. 2 is a side elevation of the apparatus;

FIG. 3 is a vertical cross section taken along lines 3—3 of FIG. 1;

FIG. 4 is a vertical cross section taken along lines 4—4 of FIG. 3; and

FIG. 5 is a vertical cross section taken along lines 5—5 of FIG. 3.

DESCRIPTION OF PREFERRED EMBODIMENT

Referring now to the drawings, there is shown a housing 10 of elongated cylindrical shape in which there is provided a concentric axially extending impeller 6 in a concentric cylindrical screen 8 surrounding and spaced from the impeller 6.

The housing 10 is mounted on frame members 12 and 14. At one end thereof, the frame 12 supports a rotary bearing 16 which in turn supports one end of the shaft 30 of the impeller 6. For easy maintenance of the screen, especially for easy removal of the cylindrical screen plate 8, the shaft can be cantilevered by means of a clamp 18 as will be described further. The clamp 18 in its normal position is bolted to an elevated surface 22 on support pedestal 20. When it is necessary to cantilever the shaft 30 the clamp 18 is moved and bolted to the lower surface 24, stepped from the surface 22 on the pedestal 20. The shaft 30 is coupled directly to an electric motor 26 in the present case by means of a coupling 28. The shaft 30 mounts a plurality of vanes 34 which are co-extensive with the screen 8.

The vanes 34 should be hollow to allow dilution water to pass therethrough from the hollow shaft 30 and can be made up of thin plate which has been pressed to form a hollow V and which is fixed to the shaft. Preferably, the vanes 34 include a plurality of apertures 48 at their crests for discharging the dilution water against the screen. Another method of constructing the vanes would make use of solid vanes intermittently drilled through from tip to shaft to pass the dilution water. At the discharge end of the impeller there is provided plates 36 between the vanes 34 which are shaped to form a conical flaring core or increased diameter of the shaft and which terminates in an annular plate 38 between the vanes 34 at the discharge end of the impeller 60 A circular end will 40 is provided at a the impeller on the shaft 30 at the discharge end. Blades 42 of short depth are added to the vanes 34 in the area of the annular plate effect 38 to effectively increase the diameter of the vanes in the discharge area.

At the other end of the shaft 30 there is provided at dilution water inlet 44 communicating with the axial bore 32. Apertures 46 are provided in the shaft communicating the bore 32 with the hollow vanes 34.

Frame 14 supports a flange 15 of housing 10. A removable stepped annular ring 54 is bolted to the flange 15 of housing 10 by means of bolts 57. A bearing housing 56 including a flange 58 is secured by studs to the removable annular ring 54. Within the housing 56 is a bearing 50 and a stuffing box 52 located on the shaft 30.

When it is required to remove the screen basket 8 as previously mentioned, the clamp 18 is moved to the surface 24 on the pedestal 20 and secured thereto, thereby clamping the shaft 30. The cantilevered shaft 30 can thus carry the bearing housing 56 at the other end. Therefore, the annular ring 54 can be removed leaving an annular space between bearing housing 56, now supported on shaft 30, and the flange 15 to allow the cylindrical screen basket 8 to be slid out of the housing 10.

The screen is supported within the housing wall by means of annular intermittent support ringe 68 fixed to the wall of the housing 10.

An inlet 61 is provided at one end of the screen which communicates a mixture of pulp stock and water to an inlet chamber 63. The mixture of stock is then forced through channels formed between the vanes 34 of the impeller 6. A centrifugal force acts on the pulp stock as the impeller is rotated. The axial velocity imparted to the pulp stock forces the larger particles towards the discharge end, while the finer particles pass through the perforated screen 8 and out the discharge 70 with most of the water. The annular space between impeller 6 and screen 8 is effectively decreased towards the discharge end by means of the circumferential plates 36 and 38 to at least maintain a constant velocity of the stock even though most of the volume of the stock is passing through the screen 8 as water and accepted stock.

The pulp stock on the screen 8 is prevented from plugging primarily by means of the dilution water being sprayed against the screen through the aperture 48 in the vanes 34. As the rejects or tailings reach the end of the screen 8, the heavier most consistent particles pass into an annular channel 76 so formed which communicates with a discharge port 72. An annular dividing plate 86 is provided between the ends of the blades 34 to split the more consistent rejected stock or tailings from those less dense tailings which would be suitable for recirculation and which are passing between the plates 86 and 38. Axially adjacent the channel 76 is another annular channel 78 which communicates with a discharge 74 and allows the less dense tailings to pass so that they can be recirculated through the screen. In order to maintain the feature of reduced reject rate. It is necessary to reduce the cross-sectional area of the space between the impeller and the screen to a minimum. Since the distance between the impeller and the inner wall of the screen basket should not be less than the average length of the larger slivers, it is necessary therefore, in order to reduce this cross-sectional area to reduce the diameter of the screen and impeller. However, in order to maintain at least the operating capacity of the conventional screens which have a one to one ratio between the diameter and length of the screen, the length the screen basket was increased while the diameter of the basket and impeller were reduced to a practical minimum. The length of the screen basket was increased in order that the contact area of the screen remain the same as for a conventional screen design to handle similar requirements. The screen basket length to diameter ratio range has been contemplated to be between 3:1 and 6:1.

In one example of a screen, the following data was observed:

| | |
|---|---|
| Length of Screen: | 64 inches |
| Diameter of Screen: | 14 inches |
| Cross-sectional Area of Space between the Impeller Shaft and Screen at Inlet End: | 137 sq. inches |
| Cross-sectional Area of Space between the annular Dividing Plate 86 and Screen 8 at Discharge End for Flow of Higher Density Reject Tailing: | 19 sq. inches |
| Cross-sectional Area of Space between Plate 38 and Annular Dividing Plate 86 at Discharge End representing Flow Space for Recirculated Stock: | 29 sq. inches |
| Speed of Shaft: | 1150 r.p.m. |
| Motor Horsepower drawn: | 135 H.P. |
| Accepted Volume of Stock: | 150 air dry tons per day of Eastern Canadian Newsprint groundwood stock |
| Pressure Drop across Screen Plate: | 2 to 5 lbs. |
| Screen Length to Diameter ratio: | 4.6:1 |

We claim:

1. A pressurized pulp screen including an elongated enclosed housing, a rotatable impeller extending axially within the housing, a screen plate of circular cross section mounted concentrically of the impeller, the screen plate and the housing being of such dimensions that there is a space between the screen plate and the wall of the housing, an inlet port provided in the area of one end of the housing for passing water and pulp stock within the screen plate, an accepted stock discharge port communicating with the space between the housing and the screen plate for discharging accepted stock and at least one tailings discharge communicating at the discharge end of the housing with the inner space defined by the screen plate; the diameter of the cross section of the screen plate at the discharge end of the screen plate being such that the annular cross-sectional area of the space between the impeller and the inner surface of the screen plate is relatively small as compared to that adjacent said inlet port so as to reduce the flow of pulp stock through the discharge, and the length to diameter ratio of the screen plate is between 3:1 and 6:1 so that the area of the screen plate remains constant for predetermined screen requirements.

2. A pulp screen as defined in claim 1, wherein the screen plate is cylindrical and is perforated while the impeller includes a shaft with a plurality of continuous radially extending vanes co-extensive with the screen plate and having a radius slightly smaller than the radius of the screen plate such that there is provided a kinetic shearing zone between the edge of the vanes and the inner surface of the screen plate, and the impeller including a tapering core diverging towards the discharge end of the screen plate such that the core at the discharge end has a radius substantially the same as the radius of the vanes so that the effective cross sectional area at the discharge end is small compared to the effective cross-sectional area of the space between the impeller and the screen plate at the inlet end.

3. A pulp screen as defined in claim 1 wherein the impeller includes a shaft and vanes and the vanes are hollow and include apertures in the edges thereof, and the hollow vanes communicates with apertures on the shaft which in turn is hollow and which communicates with a source of dilution water.

4. A pulp screen as defined in claim 1, wherein said impeller includes a shaft, mounting means mounting the shaft to be cantilevered at one end when it is required, whereby the housing can be easily opened at the other end for replacement of the screen, said mounting means including bearing means supports for both ends of the shaft when the screen is ready for operation 5. A pulp screen as defined in claim 1, wherein the impeller includes a core, and the cross-sectional area of the space between the impeller core and the screen plate at the inlet end as compared to that at the discharge end is in a ratio of 3:1.

6. A pulp screen including an elongated enclosed housing, a rotatable impeller extending axially within the housing, a perforated screen plate of circular cross section mounted concentrically of the impeller, the screen plate being of such dimensions that there is a space between the screen and the wall of the housing, the length to diameter ratio of the screen is between 3:1 and 6:1, an inlet port provided in the area of one end of the housing for passing water and pulp stock within the screen plate, an accepted stock discharge port communicating with the space between the housing and the screen for discharging accepted stock, a first discharge means at the discharge end of the screen for discharging denser reject tailings and a second discharge means axially adjacent the first tailings discharge means is provided for passing the less dense reject tailings to be recirculated and a circumferential dividing plate on the impeller is spaced from the core of the impeller at the discharge end and has a diameter less than that of the screen such that the dividing plate separates the reject tailings to be discharged at said first discharge means and the tailings to be recirculated through said second discharge means.

7. A pulp screen as defined in claim 6, wherein the first discharge means includes a first annular channel immediately adjacent the screen which communicates with a discharge port for discharging the denser reject tailings coming through the screen and immediately adjacent the first channel is a second annular channel communicating with a discharge port for passing the less dense tailings for recirculation through the screen unit.

* * * * *